Feb. 24, 1925.
B. WOODS
LINK
Filed Jan. 9, 1924
1,527,500
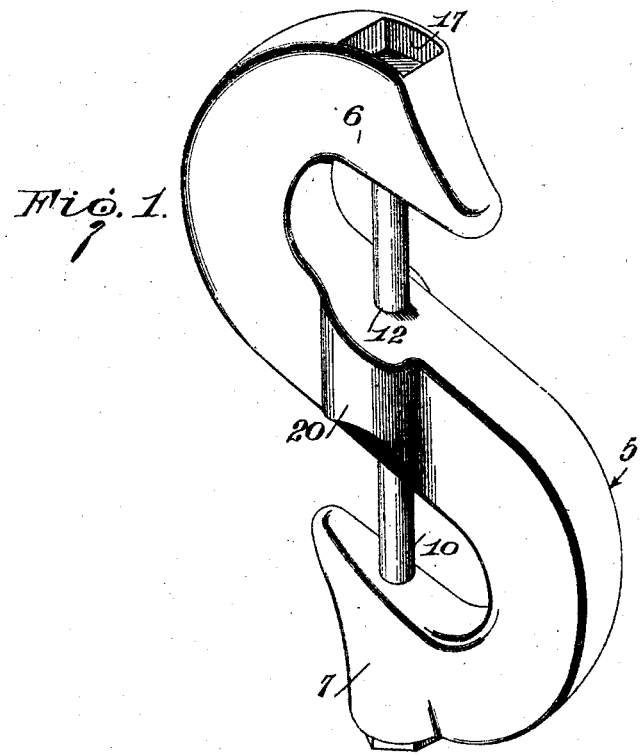
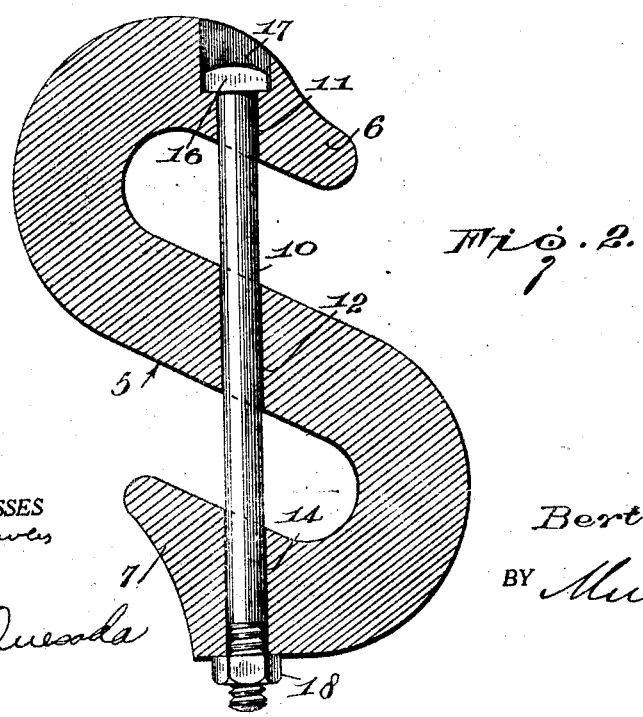
WITNESSES
INVENTOR
Bert Woods.
BY
ATTORNEYS Patented Feb. 24, 1925.

1,527,500

UNITED STATES PATENT OFFICE.

BERT WOODS, OF TULSA, OKLAHOMA.

LINK.

Application filed January 9, 1924. Serial No. 685,219.

*To all whom it may concern:*

Be it known that I, BERT WOODS, a citizen of the United States, and resident of Tulsa, in the county of Tulsa and State of Oklahoma, have invented certain new and useful Improvements in Links, of which the following is a specification.

This invention relates to safety links especially adapted for use in oil well operations, though not necessarily restricted to such use.

Briefly stated an important object of this invention is to provide a safety link wherein the oppositely located and oppositely directed bills of the same may be closed by a single fastening bolt in such a manner that the accidental disconnection of the cable or the like from the link is positively prevented.

A further object is to provide a safety link of the character specified which is of highly simplified construction, durable in use and cheap to manufacture.

In the accompanying drawing forming a part of this application and in which like numerals are employed to designate like parts throughout the same, Figure 1 is a perspective of the improved link, Figure 2 is a vertical sectional view through the same.

In the drawing wherein for the purpose of illustration is shown a preferred embodiment of the invention the numeral 5 designates the body of the improved link and the end portions of the body are bent in opposite directions to define bills 6 and 7. Figure 2 illustrates that the bills 6 and 7 are turned in opposite directions and in planes parallel to the body 5.

The sockets or cable receiving parts of the hook may be closed by means of a bolt 10 extended through alined openings 11, 12 and 14 in the link and the drawing illustrates that the head 16 of the bolt 10 is received in a squared socket 17 so that it is positively held against turning. The lower portion of the bolt 10 is threaded for engagement with a fastening nut 18, by means of which the bolt may be securely and positively held in position.

The improved link is in the nature of a casting and the bills 6 and 7 are strengthened and reinforced by means of the fastening bolt 10 which extends through the bills. By reason of this construction the strains incident to the loads borne by the links is well distributed and the bills are not likely to break at any point. Also, the body 5 extends beyond the ends of the bills and forms more or less of a guide, by means of which a cable or another link may be directed into the sockets formed by the bills.

In carrying out the invention the improved link may be cast from any metal and the intermediate portion of the same is provided with reinforcing ribs 20 at opposite sides of the opening 12, so that the opening will not result in weakening the structure.

With reference to the foregoing description taken in connection with the accompanying drawing, it will be seen that the improved link may be conveniently handled and the peculiar arrangement of the bills and the single fastening bolt 10 makes the same extremely safe in use.

Having thus described the invention, what is claimed is:—

1. A link of the character specified comprising an elongated body having its end portions formed with return bends defining bills extending in parallel relation to the body and in opposite directions, and a single fastening bolt extending diagonally through said body and through the end portions of said bills, whereby to securely connect the end portions of the bills to the body and to close the bills.

2. A link of the character specified comprising an elongated body having its end portions formed with return bends defining bills extending in parallel relation to the body and in opposite directions, and a single fastening bolt extending diagonally through said body and through the end portions of said bills, whereby to securely connect the end portions of the bills to the body and to close the bills, there being means to hold the bolt against rotation and the intermediate portion of the body being provided with reinforcing means at opposite sides of said bolt.

BERT WOODS.